United States Patent [19]

Cook

[11] Patent Number: 4,609,439

[45] Date of Patent: Sep. 2, 1986

[54] MEANS AND METHOD FOR THE ELECTROCHEMICAL REDUCTION OF A NITROAROMATIC TO PROVIDE A DYE

[75] Inventor: Ronald L. Cook, Aurora, Ill.

[73] Assignee: Texaco Inc., White Plains, N.Y.

[21] Appl. No.: 784,296

[22] Filed: Oct. 7, 1985

[51] Int. Cl.⁴ .............................................. C25B 3/00
[52] U.S. Cl. .................................... 204/74; 204/59 R
[58] Field of Search ................ 204/59 R, 74; 534/585

[56] References Cited

U.S. PATENT DOCUMENTS

| | | | |
|---|---|---|---|
| 3,338,806 | 8/1967 | Harwood | 204/74 |
| 3,475,299 | 10/1969 | Slager | 204/74 |
| 3,645,864 | 2/1972 | Lawson et al. | 204/74 |
| 3,925,172 | 12/1975 | Voorhies | 204/74 |
| 4,345,978 | 8/1982 | deGroot | 204/74 |
| 4,547,273 | 10/1985 | Ayers | 204/74 |

OTHER PUBLICATIONS

Swann, The Electro Chemical Society Preprint 77-26, Apr. 29, 1946.
Ryvkina et al., Chem. Abst. 86 (1977), #10016z.
Gershkovich et al., Chem. Abst. 93 (1980), #139989t.
Kitagawa et al., Anal. Chem. 36 (1964), J925-6.

*Primary Examiner*—Arthur P. Demers
*Attorney, Agent, or Firm*—Robert A. Kulason; James J. O'Loughlin; Ronald G. Gillespie

[57] ABSTRACT

Apparatus and method for the electrochemical reduction of a nitroaromatic to a dye includes a housing divided into two sections by membrane. An electrolyte solution including a non-aqueous electrolyte dimethylformamide and a supporting electrolyte is provided to the two sections of the housing. A cathode is located in one section of the housing while an anode is located in the other section. A nitroaromatic is provided to the section having the cathode. A direct voltage is provided to the cathode and to the anode so that a current can pass and cooperate in a reaction between the nitroaromatic and the electrolyte solution to provide a dye.

38 Claims, 1 Drawing Figure

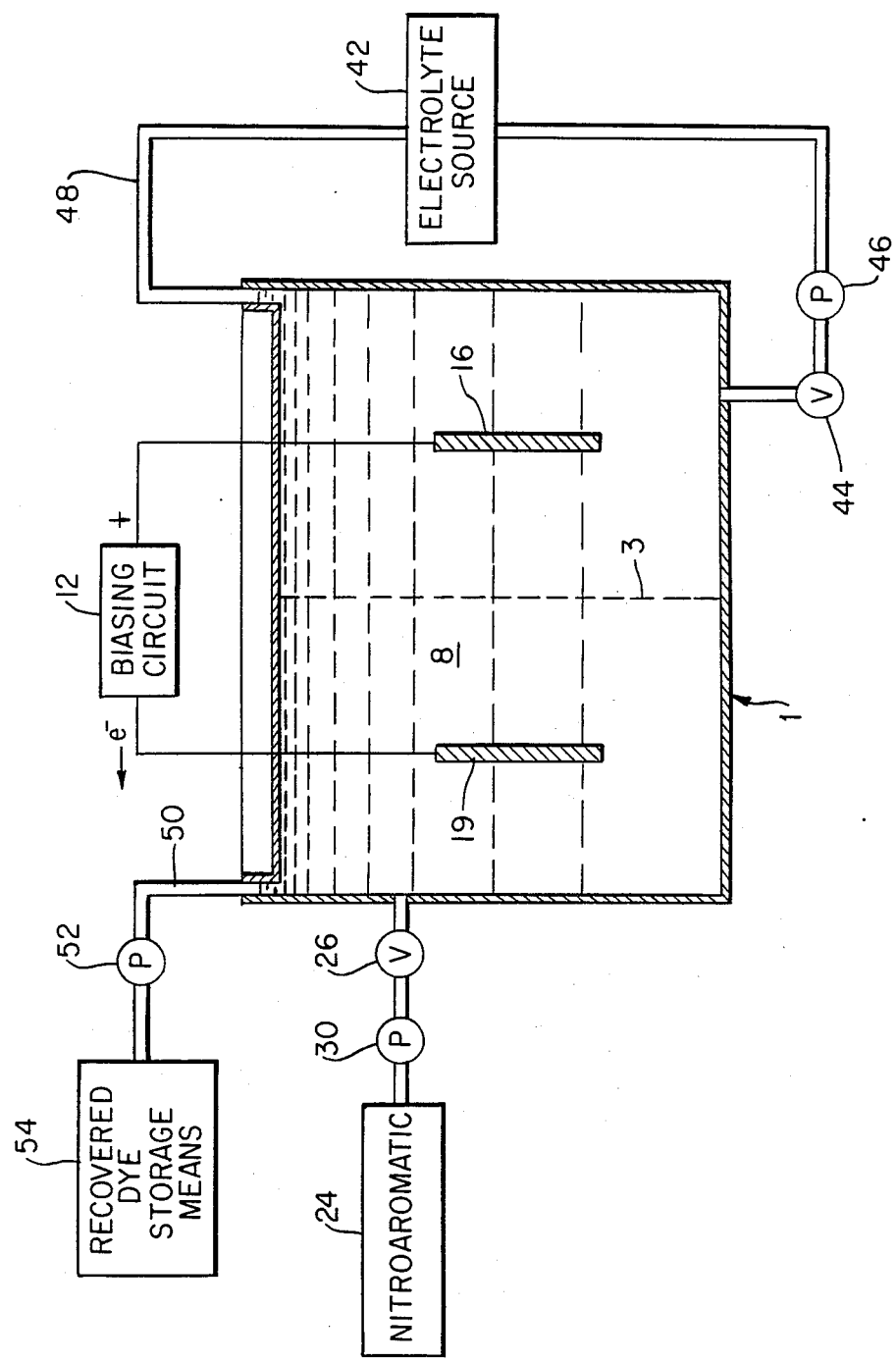

MEANS AND METHOD FOR THE ELECTROCHEMICAL REDUCTION OF A NITROAROMATIC TO PROVIDE A DYE

BACKGROUND OF THE INVENTION

Field of the Invention

The present invention relates to apparatus and method for the reduction of a nitroaromatic to an azo/azoxy dye in general and, more particularly, to electrochemical apparatus and methods.

SUMMARY OF THE INVENTION

Apparatus and method for the electrochemical reduction of a nitroaromatic to a dye includes a housing divided into two sections by membrane. An electrolyte solution including a non-aqueous electrolyte dimethylformamide and a supporting electrolyte is provided to the two sections of the housing. A cathode is located in one section of the housing while an anode is located in the other section. A nitroaromatic is provided to the section having the cathode. A direct voltage is provided to the cathode and to the anode so that a current can pass and cooperate in a reaction between the nitroaromatic and the electrolyte solution to provide a dye.

The objects and advantages of the invention will appear more fully hereinafter, from a consideration of the detailed description which follows, taking together the accompanying drawing, when one embodiment is illustrated by way of example. It is to be expressly understood, however, that the drawing is for illustrative purposes only, and it is not to be construed as defining the limits of the invention.

DESCRIPTION OF THE DRAWING

The drawing is in partial block diagram form and partial drawing form shows apparatus, constructed in accordance with the present invention, for the reduction of nitroaromatic to provide a dye.

DESCRIPTION OF A PREFERRED EMBODIMENT OF THE INVENTION

Referring to the FIGURE, there is shown a housing 1 made of suitable material to contain an electrolyte solution having a membrane 3. The membrane 3 will pass ions. Contained within housing 1 is an electrolyte solution including a non-aqueous electrolyte, such as dimethylformamide, and a supporting electrolyte selected from the following: tetrabutylammonium perchlorate, lithium perchlorate, magnesium perchlorate and ammonium perchlorate.

A biasing circuit 12 has a positive terminal connected to an anode 16 and a negative terminal connected to a cathode 19. Anode 16 may be made of platinum and cathode 19 may be made of platinum or copper. A source 24 provides a nitroaromatic, such as 1,3-dinitrobenzene or 2,4-dinitrotoluene through a valve 26, using a pump 30, to housing 1. A source 42 provides the electrolyte solution to housing 1 through a valve 44 aided by a pump 46. The electrolyte solution leaving housing 1 is returned to electrolyte source 42 by way of a line 48.

The apparatus and method hereinbefore reduces a nitroaromatic to provide a dye.

What is claimed is:

1. Apparatus for the electrochemical reduction of a nitroaromatic to provide a dye comprising:

housing means for containing an electrolyte solution including dimethylformamide with a supporting electrolyte, means for dividing the housing means into two sections while permitting the ions to move between the two sections, means for providing a nitroaromatic to one section of housing means, a cathode located in the section of the housing means receiving the nitroaromatic, an anode located in the section of the housing not receiving the nitroaromatic, means for providing a direct current voltage to the cathode to the anode, to cooperate in a reaction between the nitroaromatic in the electrolyte solution to provide a dye, and means for removing the dye from the housing means.

2. Apparatus as described in claim 1 in which the nitroaromatic is 1,3-dinitrobenzene.

3. Apparatus as described in claim 2 in which the dye is an azo dye.

4. Apparatus as described in claim 3 in which the anode and the cathode are made from copper.

5. Apparatus as described in claim 4 in which the azo dye is 3,3'-nitroazobenzene.

6. Apparatus as described in claim 4 in which the azo dye is 4,4'-methyl-3,3'-nitroazobenzene.

7. Apparatus as described in claim 2 in which the anode and the cathode are made from platinum.

8. Apparatus as described in claim 7 in which the dye is an azo dye.

9. Apparatus as described in claim 8 in which the azo dye is 3,3'-nitroazobenzene.

10. Apparatus as described in claim 8 in which the azo dye is 4,4'-methyl-3,3'-nitroazobenzene.

11. Apparatus as described in claim 1 in which the nitroaromatic is 2,4-dinitrotoluene.

12. Apparatus as described in claim 1 in which the dye is an azo dye.

13. Apparatus as described in claim 12 in which the anode is platinum and the cathode is copper.

14. Apparatus as described in claim 13 in which the azo dye is 3,3'-nitroazobenzene.

15. Apparatus as described in claim 13 in which the azo dye is 4,4'-methyl-3,3'-nitroazobenzene.

16. Apparatus as described in claim 11 in which the dye is an azo dye.

17. Apparatus as described in claim 16 in which the anode and the cathode are made from platinum.

18. Apparatus as described in claim 17 in which the azo dye is 3,3'-nitroazobenzene.

19. Apparatus as described in claim 17 in which the azo dye is 4,4'-methyl-3,3'-nitroazobenzene.

20. A method for electrochemically reducing a nitroaromatic to provide a dye comprising the steps of:

containing an electrolyte solution including dimethylformamide with a supporting electrolyte in a housing, dividing the housing into two sections while permitting the electrolyte solution to move between the two sections, providing a nitroaromatic to one section of the housing, locating a cathode in the section of the housing receiving the nitroaromatic, locating an anode in the section of the housing not receiving the nitroaromatic, providing a direct current voltage to the cathode and to the anode, to cooperate in a reaction between the nitroaromatic in the electrolyte solution to provide a dye, and removing the dye from the housing.

21. A method as described in claim 20 in which the nitroaromatic is 1,3-dinitrobenzene.

22. A method as described in claim 21 in which the dye is an azo dye.

23. A method as described in claim 22 in which the anode is platinum and the cathode is copper.

24. A method as described in claim 23 in which the azo dye is 3,3'-nitroazobenzene.

25. A method as described in claim 23 in which the azo dye is 4,4'-methyl-3,3'-nitroazobenzene.

26. A method as described in claim 21 in which the dye is an azo dye.

27. A method as described in claim 26 in which the anode and the cathode are a platinum anode and a platinum cathode.

28. A method as described in claim 27 in which the azo dye is 3,3'-nitroazobenzene.

29. A method as described in claim 27 in which the azo dye is 4,4'-methyl-3,3'-nitroazobenzene.

30. A method as described in claim 20 in which the nitroaromatic is 2,4-dinitrotoluene.

31. A method as described in claim 30 in which the dye is an azo dye.

32. A method as described in claim 31 in which the anode is platinum and the cathode is copper.

33. A method as described in claim 32 in which the azo dye is 3,3'-nitroazobenzene.

34. A method as described in claim 32 in which the azo dye is 4,4'-methyl-3,3'-nitroazobenzene.

35. A method as described in claim 30 in which the dye is an azo dye.

36. A method as described in claim 35 in which the anode and the cathode are a platinum anode and a platinum cathode.

37. A method as described in claim 36 in which the azo dye is 3,3'-nitroazobenzene.

38. A method as described in claim 36 in which the azo dye is 4,4'-methyl-3,3'-nitroazobenzene.

* * * * *